April 16, 1957 H. W. BENNETT 2,788,719
FLOW CONTROL APPARATUS
Filed Feb. 11, 1954 6 Sheets-Sheet 1

DIRECTION OF FLOW

Inventor
Henry W. Bennett
By Evans, Glaister & Anderson
Attorneys

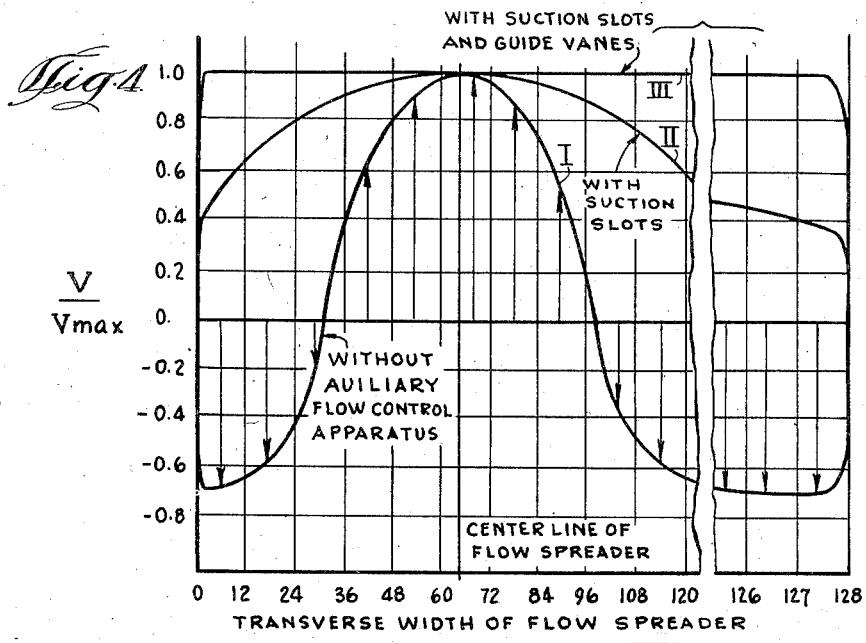
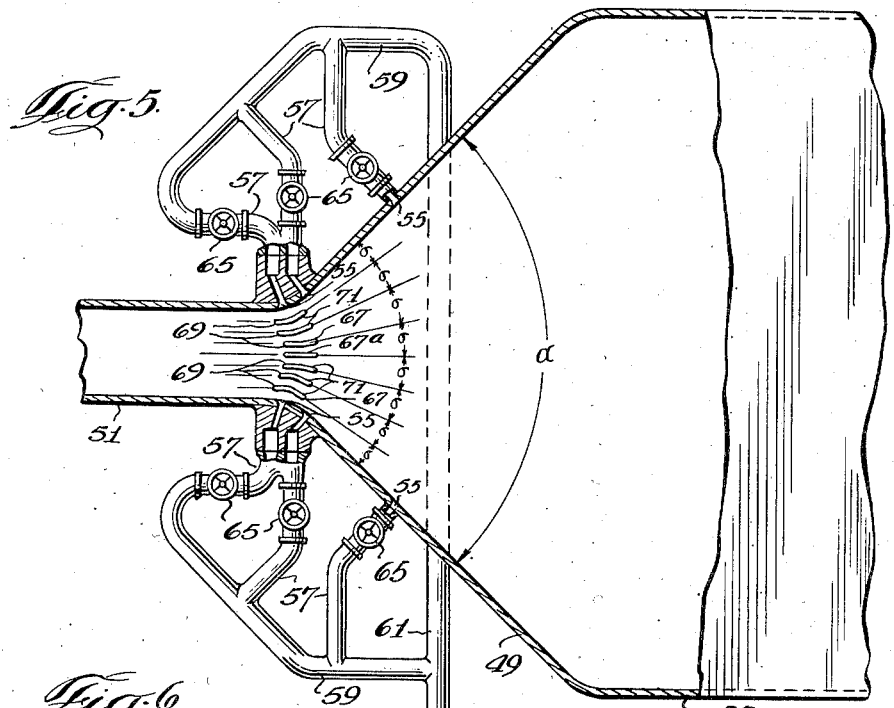
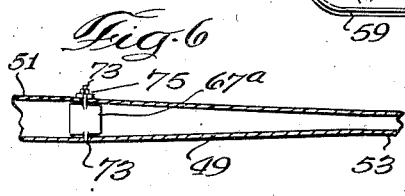

April 16, 1957 H. W. BENNETT 2,788,719
FLOW CONTROL APPARATUS
Filed Feb. 11, 1954 6 Sheets-Sheet 3

Inventor
Henry W. Bennett

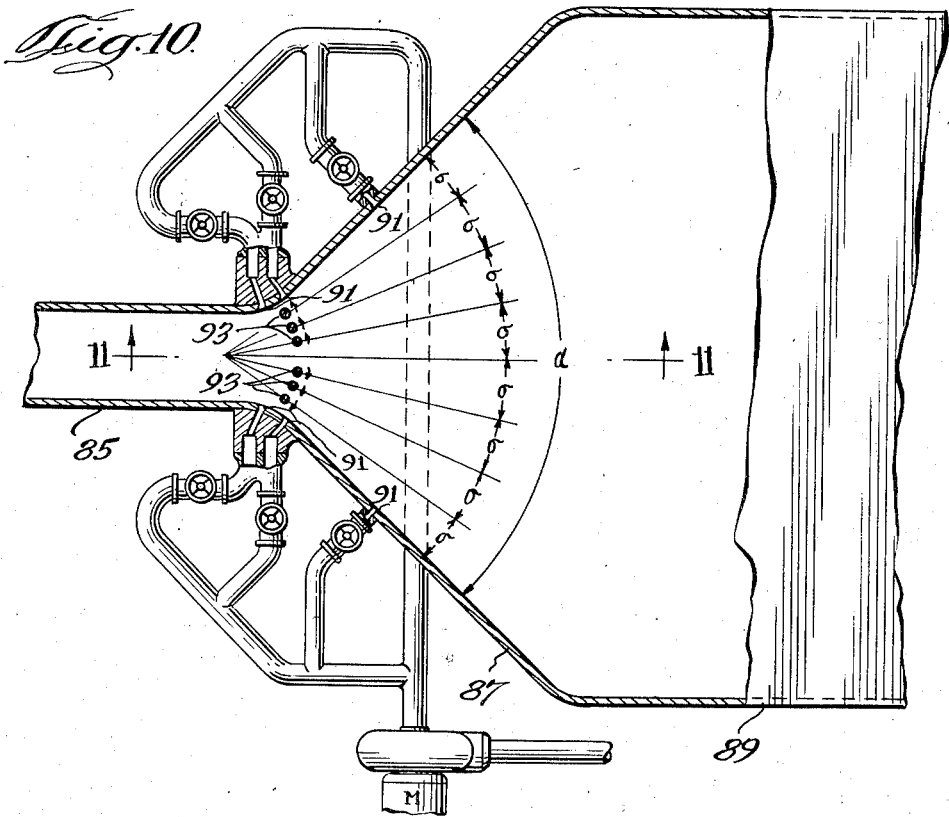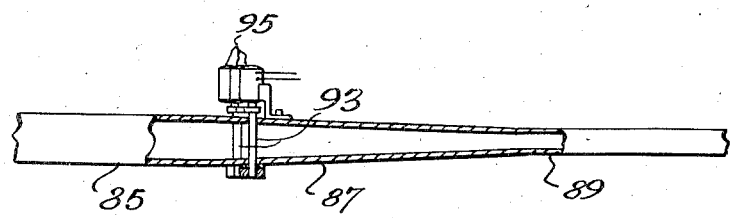

April 16, 1957 H. W. BENNETT 2,788,719
FLOW CONTROL APPARATUS
Filed Feb. 11, 1954 6 Sheets-Sheet 5
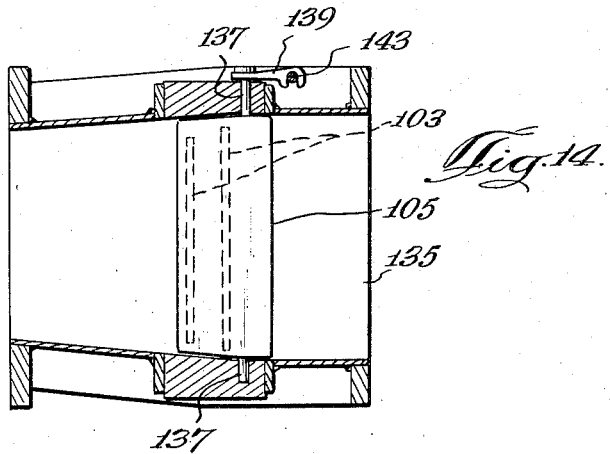
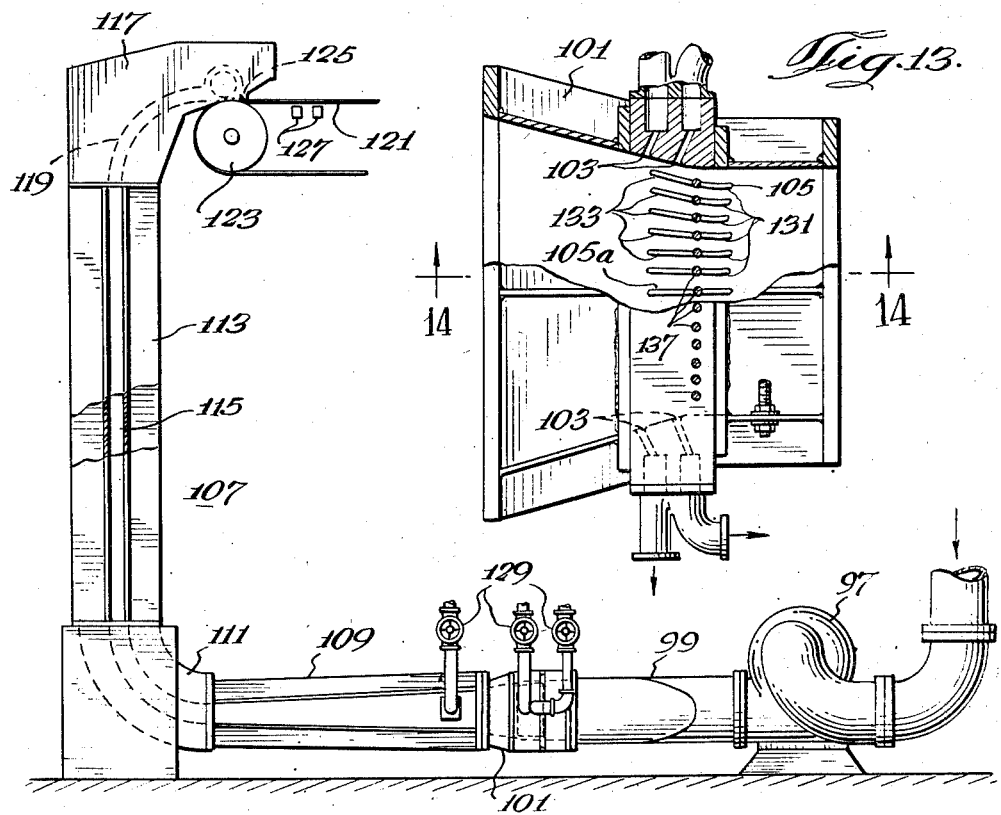
Inventor
Henry W. Bennett
By Sloane, Glaister & Anderson
Attorneys

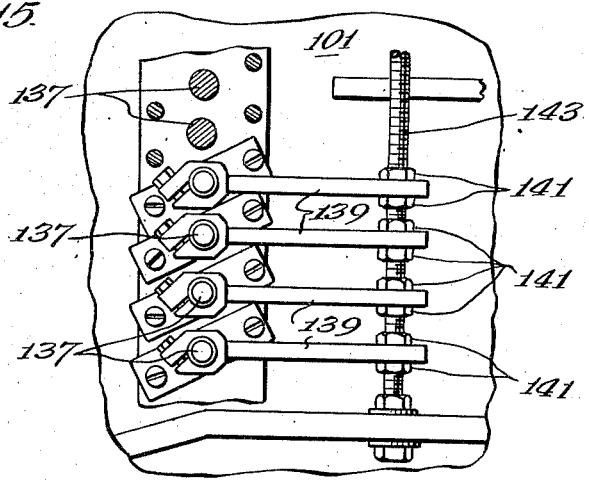
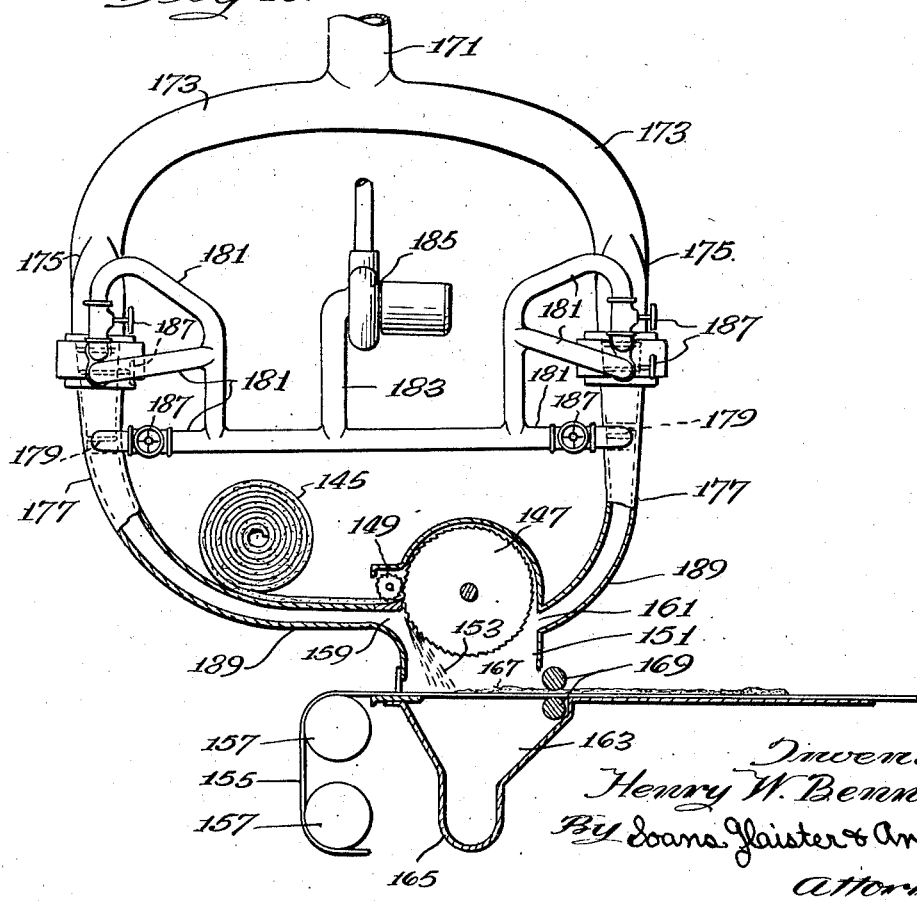

United States Patent Office 2,788,719
Patented Apr. 16, 1957

2,788,719

FLOW CONTROL APPARATUS

Henry W. Bennett, Neenah, Wis., assignor, by mesne assignments, to Kimberly-Clark Corporation, a corporation of Delaware Application February 11, 1954, Serial No. 409,571

34 Claims. (Cl. 92—44)

The present invention relates, in its broader aspects, to the control of confined streams of liquids and gases. More particularly, the invention relates to the control of confined streams of liquids and gases which have fibers and/or other materials suspended or dispersed therein. Generally stated, the principal object of the invention is to provide flow control means for such streams.

The control of confined streams of liquids and gases, and especially confined streams of liquids and gases which contain fibers and/or other suspensions or dispersions, is of great importance in various arts, and especially in the web-forming art. For example, in the operation of papermaking machines of various types, and particularly Fourdrinier machines, it is necessary to deliver the fiber-containing liquid stock from which the paper is manufactured to the web-forming region of the machine in the form of a wide and relatively shallow flowing stream of rectangular cross section which may be under considerable pressure.

In Fourdrinier type papermaking machines, it is necessary, for economic reasons, to collect and re-use the white water (i. e., the liquids which pass through the Fourdrinier wire), the white water being mixed with additional pulp or stock before being returned to the web-forming region. The practical method of accomplishing this operation is by the use of a suitable pump, normally designated as the fan pump, in conjunction with a closed conduit system. It thus becomes necessary in the stock conduit system to transform the confined stream of liquid discharged by the fan pump, which is usually circular in outline, into the shallow, relatively wide stream which is required at the web-forming region, and the portion (or portions) of the stock conduit system which accomplishes this transformation is conventionally termed a "flow spreader."

Moreover, in order to produce a paper sheet having uniform physical properties, the paper stock (which may include water, pulp, fiber, filler, dye, glue, etc.) delivered to the web-forming region of the machine should be evenly distributed across the machine width. Expressed mathematically, this means that the kinetic energy and potential energy in unit areas of the stream delivered to the web-forming region should be as uniform as possible throughout the stream cross section, and in addition, the entire stream should be maintained in a condition which is as near to steady-state flow as it is possible to obtain. In other words, the stock should be delivered to the web-forming region at a uniform pressure and velocity across the width of the machine, and the pressure and velocity relationship should be invariant with time.

Similarly, in the operation of certain forms of air-forming equipment, it is necessary to deliver one or more wide and relatively shallow flowing streams of air to the web-forming chamber of the equipment for guiding or focusing a stream of separated fibers within the forming chamber to the surface of a moving wire. The air which is directed into the forming chamber passes through the moving wire and is generally collected and recirculated through the system. This is usually accomplished by means of a suitable suction fan or blower in conjunction with a closed conduit system. As in the case of the conduit system of a Fourdrinier papermaking machine, the conduit system of such air-forming equipment requires at least one flow spreader, that is, a conduit section which transforms the confined stream of air discharged by the blower into the shallow, relatively wide stream which is required at the web-forming chamber.

Also, as in the case of a stream of stock which is delivered to the web-forming region of a papermaking machine, in order to produce a web having uniform physical properties, each of the air streams should be delivered to the forming chamber of the air-forming equipment at a uniform pressure and velocity across the width of the stream, and the pressure and velocity relationship should be invariant with time.

The desirability of obtaining uniform pressure, steady-state flow conditions described above during the operation of web-forming equipment is well recognized in the web-forming art, and various flow spreaders and other flow control arrangements have been suggested and used in an effort to attain these conditions. The flow control arrangements which have been suggested or used for controlling and regulating the fluid include flow spreading systems wherein the flowing stream discharged from the fan pump or blower is changed in very gradual stages from its initial and usually circular form to the shallow, elongated, rectangularly-shaped form required in the web-forming region, and flow spreading conduit systems which utilize guide vanes of certain particular types, or rotating shafts disposed in certain particular locations. These arrangements have not been completely satisfactory, although they are somewhat better than the flow spreading devices previously used in the art.

A further and more specific object of the invention is to provide improved flow control means for the flow-spreading stock conduit systems of web-forming equipment.

As will hereinafter appear, the above stated objects of the invention are accomplished by the provision of suitably dimensioned flow-spreading conduit systems and by selectively removing portions of the fluid flowing through the conduit systems from adjacent the solid boundaries thereof, or alternatively, by selectively adding energy to portions of the fluid flowing through said conduit systems adjacent the solid boundaries thereof. In certain instances, improved results may be attained by the further addition of guide vanes or rotating shafts of certain particular types and shapes, disposed in particular areas and locations within the conduit systems. The invention makes possible much more positive and much more effective control of flowing streams of liquids and gases, as for example, flowing streams of liquids and gases encountered in web-forming equipment, than has heretofore been attained; and in addition, this improved flow control is accomplished in relatively short distances of flow. Thus, in addition to providing improved control of flow spreading and other operations, the invention makes possible a material decrease in the physical dimensions and a reduction of cost of the equipment wherein it is used.

In the drawings, wherein are illustrated certain embodiments of the invention:

Figure 1a is an enlarged, detailed view of a portion of the flow conduit illustrated in Figure 1;

Figure 4 is a graph illustrating certain of the hydraulic characteristics of the flow conduit structure illustrated in Figures 1 and 2, the abscissa scale at the extreme right hand end of the graph being expanded so as to illustrate the effect of the conduit wall on the velocity of the fluid;

Figure 5 is a plan view, partially in section, illustrating a portion of a flow conduit system similar to that shown in Figure 1, but having additional flow control means in accordance with the present invention;

Figure 6 is a vertical, sectional view on the general line 6—6 of Figure 5;

Figure 10 is a plan view, partially in section, similar to Figure 5, of a portion of a flow conduit system embodying another combination of flow control means in accordance with the present invention;

Figure 11 is a side elevational view, partially in section, of the structure illustrated in Figure 10;

Figure 12 is a diagrammatic, elevational view of the web-forming inlet end of a high-speed, pressure inlet with flow control means in the stock conduit system in accordance with the principles of the present invention;

Figure 13 is an enlarged plan view of a portion of the flow control means illustrated in Figure 12;

Figure 14 is a sectional view on the general line 14—14 of Figure 13;

Figure 1:
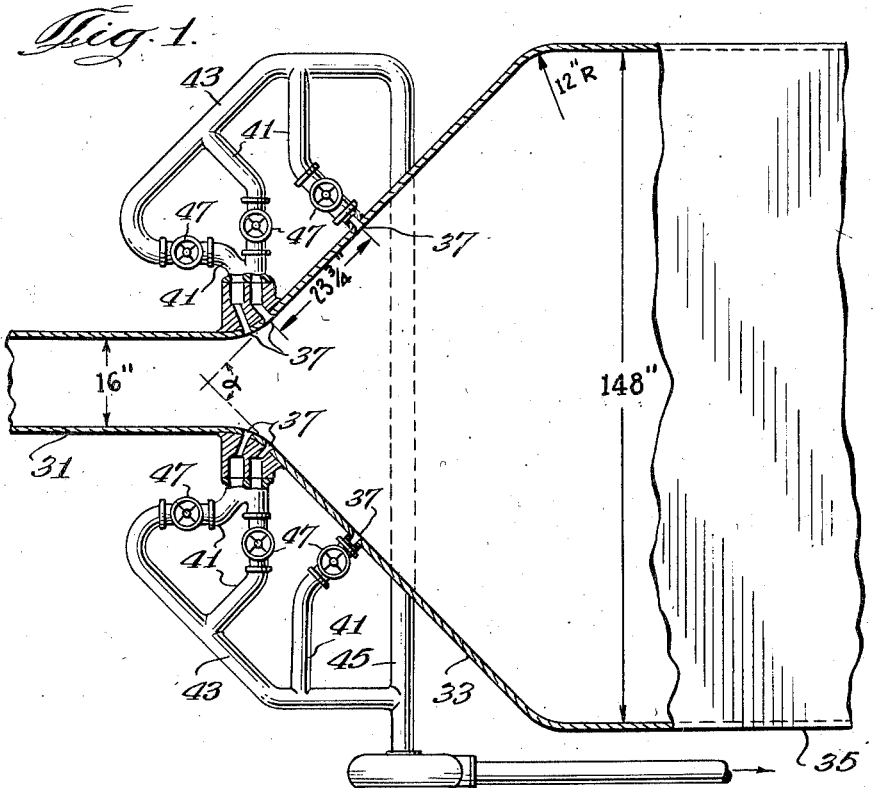
Figure 1 is a plan view, partially in section, of a portion of the flow conduit system of one form of web-forming equipment embodying certain of the features of the present invention.

Figure 15 is an enlarged, fragmentary plan view illustrating certain of the features of the guide vane adjusting means embodied in the apparatus shown more particularly in Figures 13 and 14; and Figure 16 is a diagrammatic elevational view, partially in section, of air-forming equipment having air inflow conduits which are directed into the web-forming region. Flow control means in accordance with the present invention are embodied in each of the air inflow conduits of this equipment.

As previously stated, the flow control means of the present invention have particular relation to the control of flowing streams of fluids within conduit systems, which fluids may include dispersions or suspensions of fibers or other materials. The invention has particular value in connection with, and is specially applicable to, flow spreaders such as are used for transforming a flowing stream of liquid or gas discharged from a fan pump or blower into the shallow, elongated, rectangularly-shaped form required in the web-forming region of web-forming equipment. Accordingly, the invention will be described as applied to flow spreaders adapted for use in conjunction with web-forming equipment of various types. It will be understood, however, that the invention is capable of use in conjunction with other types of flow control apparatus and it will also be understood that the particular structures illustrated in the drawings are merely illustrative embodiments of the general principles involved.

Flow spreaders as used in the conduit systems of web-forming equipment comprise, essentially, rigid-walled conduits adapted to be connected into the conduit system between the fan pump or blower and the web-forming region of the equipment for the purpose of effecting the required widening and reduction in depth of the flowing stream entering the web-forming region of the equipment. The conduit section (or sections) between the fan pump or blower and the throat or inflow end of the flow spreader is suitably dimensioned and shaped so as to establish the flowing stream of fluid in a substantially steady-state flow condition at it enters the flow spreader. In addition, the conduit section (or sections) between the outflow end of the flow spreader and the forming region of the web-forming equipment is suitably dimensioned and shaped so as to maintain the fluid which flows outwardly of the flow spreader in a steady-state condition until it enters the web-forming region of the equipment. Flow spreaders in accordance with the present invention are generally provided with one or more suction or delivery slots disposed adjacent the inflow end of the flow spreader and possibly elsewhere along the length thereof, through which controlled amounts of "dead" or low energy fluid may be removed from, or through which controlled amounts of "live" or high energy fluid may be added to the flowing stream, the slots being connected through suitable conduits to suction or delivering means. As used herein, the slots within a flow spreader are designated as suction slots whenever they are used for removing fluid from the flow spreader. Since fluid will pass through the suction slots whenever a pressure differential exists on opposite sides of the suction slots, various "suction means" may be employed to establish or control a pressure differential across the suction slots. This pressure differential must be great enough to remove the desired amounts of fluid from the flow spreader against whatever flow resistance may develop in the slots and their associated conduits. Where necessary, suction pumps or barometric legs, with proper controls, may be used to remove the desired amounts of fluid from the flow spreader. In other cases, the static pressure head within the flow spreader near the suction slot entrances may be sufficiently high to discharge the desired amounts of fluid through the slots against whatever flow resistance may be present. In such a case, auxiliary devices such as pumps are unnecessary. In the following, the term "suction means" is intended to include all of these various arrangements and their equivalents.

The slots are so shaped and so positioned relative to the dimensions of the flow spreader, and the amount of fluid withdrawn or delivered through the slots so regulated that the fluid flowing through the flow spreader is maintained in a substantially steady-state flow condition. In addition, the fluid which is delivered to the outflow end of the flow spreader has a more uniform pressure across the width of the flow spreader and a more uniform velocity throughout the cross-sectional area in that region than it would have in the absence of such suction or delivery slots.

A flow spreader embodying an arrangement of suction slots in accordance with the invention is illustrated in Figure 1, in which figure an inflow conduit 31 is shown connected to a rigid-walled, laterally-diverging conduit section, or flow spreader 33. The flow spreader 33 connects with a straight-sided outflow section 35, which may, for example, lead to the web-forming region of a paper-making machine. Conveniently, the opening at the inflow end of the flow spreader 33 is rectangular in outline, and it may be square. The opening at the outflow end of the flow spreader 33 is likewise of rectangular outline. However, it is wider, and it may be of lesser or greater depth than the inflow opening. The inflow conduit 31 should be of such dimensions that a flow condition which at least approximates a steady-state flow is attained at the inflow end of the flow spreader 33.

A plurality of transversely extending suction slots 37 of generally rectangular cross-section are located along the side walls of the flow spreader. The suction slots 37 connect with a centrifugal-type suction pump 39 through conduits 41, 43, and 45. Each of the conduits 41 is provided with a suitable control valve 47 for regulating the amount of fluid drawn therethrough.

In order to fully appreciate the present invention, it is useful to understand the phenomenon of "separation" which often occurs within a stream of fluid flowing through a flow spreader. When a fluid stream flows within a conduit, it loses energy because of frictional contact with the walls of the conduit. This loss of energy is evidenced by a reduction in the velocity of the fluid adjacent the walls of the conduit. The velocity of the fluid is zero at the walls of the conduit and increases rapidly in a direction inwardly from the walls until it attains free stream velocity, that is, the velocity of the fluid whose energy is unaffected by the presence of the conduit walls. The narrow region adjacent the wall, wherein the fluid moves at a velocity which is slower than its free stream velocity, is generally referred to as the boundary layer of the stream. If the fluid within the conduit should suddenly move into a region of higher pressure, as for example, when the fluid moves into a conduit section of greatly increasing cross-sectional area, the fluid in the boundary layer of the moving stream may not have enough energy to overcome the higher pressure which it encounters; and when this occurs, the "dead" or low energy fluid is forced to stop and flow in the reverse direction, thus separating from the main fluid stream. The occurrence of separation initiates vortex formation at the separation point. Separation of the low energy fluid from the main fluid stream commonly occurs along the walls of a flow spreader of increasing cross-sectional area. This separation may be prevented by means of suction slots which are positioned in the walls of the flow spreader so as to remove the low energy fluid from the boundary layer of the stream at the point where the boundary layer is about to separate from the main stream. Removal of the low energy fluid from the boundary layer of the stream by the suction slot allows a new boundary layer to form downstream of that slot. The newly-formed boundary layer possesses enough energy to move downstream for some distance before it loses sufficient energy by frictional contact with the wall of the flow spreader to separate from the main stream. Once again, separation may be prevented by means of suction slots which are positioned in the walls of the flow spreader at the point where this newly-formed boundary layer is about to separate the main stream, and as in the case of the upstream slots, the removal of the low energy fluid from the boundary layer of the stream allows a new boundary layer to be formed downstream of the suction slots. By suitably dimensioning and suitably positioning a plurality of suction slots along the flow spreader, one is able to completely eliminate the phenomenon of separation and the resulting eddy formation in the fluid stream.

The number of suction slots which are needed and the location of the slots will vary with the design and physical dimensions of the flow spreader or other type of conduit system which is employed. Naturally, the most accurate method of determining the optimum position of the slots within a flow spreader would be to calculate the shape and growth of the boundary layer of the fluid stream within the flow spreader and locate the slots at those positions where the calculations indicate that the boundary layer would be about to separate from the main stream. Unfortunately, the state of the art at the present time does not permit such precise calculations and the best that can be done is to calculate the general areas where separation will occur. As a consequence, the final determination of the positions of the suction slots is made empirically by suitable model studies.

As illustrated particularly in Figure 1a, the upstream edge of each of the suction slots 37 is preferably well rounded. This construction permits the most effective removal of the low energy fluid from the boundary layer of the stream. The downstream edge of each of the slots 37 is preferably just broken so as to create a stagnation line extending along the broken edge of the slot, which produces an increased pressure at the stagnation line. This increased pressure within the boundary layer relieves the adverse pressure gradiant near the wall for some distance beyond the slot. This effect is, of course, utilized most fully if the slot is relatively narrow and if the velocity of the fluid which passes through the slot is relatively high.

In order to obtain satisfactory results, the width of the individual suction slots 37 should be within ¼ to 4 times the width of the boundary layer of the fluid stream within the flow spreader and the height of the suction slots should be at least about 75 percent of the height of the side walls in which the slots are located. When the height of a suction slot is less than the height of the side wall in which it is located, it is desirable to suitably bevel or curve the upper and lower edge of the slot so as to make the flow of fluid into the slot as smooth as possible. Most satisfactory results appear to occur when the width of each of the suction slots 37 is approximately equal to the width of the boundary layer and the height of each of the suction slots 37 is approximately equal to the height of the side wall of the flow spreader in which it is located.

Each of the suction slots 37 should extend outwardly from the inner face of the side wall within which it is located at an angle between 50 and 130 degrees for a distance at least twice the width of the suction slot. If a suction slot slants backwardly from the side wall of the flow spreader at angles much less than 50 degrees, the hydraulic losses through the suction slot are greatly increased. Furthermore, this arrangement is likely to promote back flow short distances downstream from the suction slot. On the other hand, if the suction slot slants forwardly of the side wall of the flow spreader at angles much greater than 130 degrees, the suction slot is unable to establish the desired pressure conditions near the wall for any significant distance downstream of the suction slot, thereby making the suction slot less effective in preventing back flow and separation. For optimum results, the suction slots 37 should extend approximately perpendicularly from the side walls of the flow spreader.

The velocity of the fluid which passes through each of the slots is, of course, directly related to the amount of fluid which is removed through each of the suction slots. The beneficial effect of a suction slot in preventing separation downstream of the slot will increase as the amount of fluid drawn through the slot increases until approximately 100 percent of the total amount of fluid in the boundary layer is drawn through the slot. Further removal of fluid through the suction slot will have little effect downstream of that slot. For most purposes, a suitably designed and positioned slot which removes between 20 and 200 percent of the total amount of fluid within the boundary layer is satisfactory, with the optimum fluid removal being between 90 and 100 percent of the total amount of fluid in the boundary layer.

Figure 2:
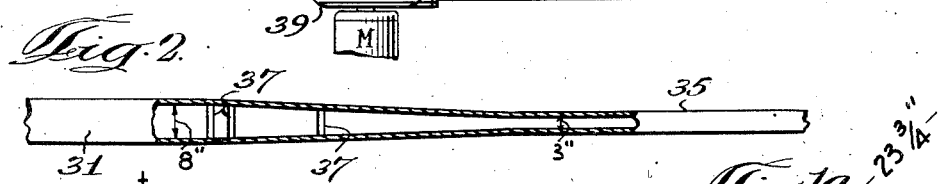
Figure 2 is a side elevational view partially in section, of the flow conduit illustrated in Figure 1.
Figure 3:
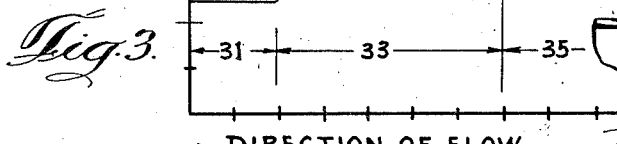
Figure 3 is a graph illustrating the variation in the cross-sectional area along the flow conduit illustrated in Figures 1 and 2.

In one practical embodiment of a flow spreader 33 such as is illustrated in Figures 1 and 2, the flow spreader had a divergence angle, the angle $a$ in Figure 1, of 90°. The widths of the flow spreader at the inflow and outflow ends were 16 inches and 148 inches, respectively, and the heights of the flow spreader at the inflow and outflow ends of the flow spreader were 8 inches and 3 inches, respectively. The inflow and outflow ends of the flow spreader connected smoothly with an inflow and outflow conduit, respectively, through curved sections, each having a 12-inch radius. The cross-sectional area of this flow spreader increased in the direction of flow therethrough, as shown in Figure 3. It was empirically determined that symmetrically-located slots were required on each side of the flow spreader, two adjacent the entrance of the flow spreader along the curved section and one further downstream. Some help was provided by the knowledge that separation in an expanding area conduit is most likely at those points where there are sharp or sudden increases in pressure. The position of the upstream slot on each side of the flow spreader was located along the curved section at an angle of 22° 30′ measured from the inflow end of the flow spreader. The second slot on each side of the flow spreader was located at the upper end of the curved section at an angle of 21° 10′ from the first slot and the third slot on each side of the flow spreader was located at a point spaced 23.75 inches from the second slot.

Each of the slots had a width of ⅝″, an upstream edge with a radius of curvature of ⅜″, and a downstream edge which was just broken. The valves were adjusted so that approximately ¾ percent of the amount of fluid entering the flow spreader flowed outwardly through each of the first and third slots on each side of the flow spreader and approximately 1½ percent of the total amount of fluid entering the flow spreader flowed outwardly through the second or intermediate slots on each side of the flow spreader.

The described suction slots 37 effectively eliminated separation and eddying within the flow spreader and effected quite a remarkable improvement in the pressure and velocity relationships existing at the outflow end of the flow spreader as compared with a similar flow spreader which did not have the suction slots.

In Figure 4, the curve labeled I is illustrative of the variation in the velocity of the flowing stream which is normally encountered along a transverse or across-the-machine section of a flow spreader such as that illustrated at 1, in the absence of suction slots as described. The variation in the transverse velocity in this graph is expressed as the ratio of the velocity (V) existing at any given point across the outflow end of the flow spreader when divided by the maximum velocity (V max) existing within the flow spreader. The curve labeled II in Figure 4 shows the effect of the suction slots 37, and it is evident that a remarkable improvement in the velocity distribution across the outflow end of the flow spreader has been accomplished by the addition of the suction slots. Since the velocity distribution of the fluid within a flow spreader is improved by the application of suction slots, one can apply this invention with beneficial results to flow spreaders wherein separation is imminent, but does not actually occur.

It will be noted that the inner surfaces of the side walls of the flow spreader 33 are curved at the juncture of the flow spreader and the inflow conduit 31 and at the juncture of the flow spreader 33 and outflow conduit 35. The surface curvatures of the side walls desirably follow the stream lines of the flow in these regions and are of considerable value in attaining uniform steady-state flow at and forward of the outlet of the flow spreader.

As has been previously indicated, the present invention is particularly adapted for use in expanding area type flow spreaders, i. e., wherein the cross-sectional area increases in the direction of flow through the flow spreader. In order to maintain the flow pattern, it is generally desirable to maintain the cross-sectional area of that portion of the supply conduit immediately preceding the flow spreader at least as large as the cross-sectional area of adjacent upstream portions of the supply conduit. It is permissible, however, to decrease the cross-sectional area of the supply conduit in the region immediately preceding the flow spreader if this is done very gradually, and in some instances, this may be found desirable. Also, in some instances, a perforated baffle plate or equivalent flow-evening unit may be placed adjacent the inflow or outflow end of the flow spreader or adjacent both ends with advantageous results.

The separation and resultant eddying and vortex formation which occurs along the diverging walls of an expanding area type flow spreader may also be eliminated by adding energy to the fluid of the boundary layer at points immediately preceding the points where separation would normally occur. The added energy imparts added momentum to the fluid of the boundary layer. The added energy makes it possible for the boundary layer to overcome the adverse pressure gradiant which it encounters in its flow path for some distance beyond the point where the energy is injected into the fluid. Energy might be added to the boundary layer in various ways, for example, by injecting jets of fluid into the boundary layer at the appropriate points along the flow spreader, the jets being injected into the flow spreader in the stream direction and generally parallel to the walls of the flow spreader (not shown). The position of the delivery slots, the size and shape of the delivery slots, as well as the velocity of the fluid which should be injected into the flow spreader through the delivery slots in order to prevent separation may be determined empirically for a given flow spreader. It is also possible to add energy to the boundary layer of the fluid by other means, such as traveling belts, rotating cylinders, etc. (not shown).

Although the invention has been described above in connection with flow spreaders which have a pair of diverging side walls, it is, of course, possible to apply the invention to a flow spreader which has only one diverging side wall. When the flow spreader has a single diverging side wall, it may be possible to prevent separation from occurring within the flow spreader by removing fluid from adjacent the solid boundaries of only the diverging side wall or by adding energy only to portions of the fluid adjacent the solid boundaries of the diverging side wall. It is also possible to utilize the invention in multiple conduit systems, for example, in a system where there are a plurality of expanding area type flow spreaders whose outlet ends connect into a common conduit. Energy may be added to fluid or removed from the boundary layers of the individual flow spreaders and the common conduit, as required, in order to prevent separation from occurring within the system.

The velocity distribution of a fluid stream across the width of a flow spreader at any point along its length is ordinarily influenced by the velocity distribution of the stream across the width of the flow spreader at its inlet. When the velocity distribution of a fluid across the inlet end of an expanding area type flow spreader is uniform, one may prevent separation within the flow spreader when it has a relatively wide divergence angle (in certain instances approaching 180°), by the above described flow control means, i. e., by either removing a portion of the lower energy fluid from adjacent the side walls of the flow spreader, or by adding energy to the lower energy fluid which is adjacent the side walls of the flow spreader. When the velocity of the fluid across the inlet end of the flow spreader is not uniform, it may be more difficult or even impossible to prevent separation within the flow spreader when its divergence angle is considerably below 180° merely by removing the lower energy fluid from adjacent the side walls of the flow spreader, or by adding energy to the lower energy fluid which is adjacent the side walls of the flow spreader.

Although separation may be prevented in an expanding area type flow spreader by the above described flow control means, there will generally exist a greater variation in the velocity distribution across the outlet end of the flow spreader than across the inlet end of the flow spreader. This variation in the velocity distribution across the outlet of the flow spreader will generally increase with increasing divergence angles of the flow spreader and/or as the velocity distribution across the inlet of the flow spreader becomes less uniform.

One can always improve the velocity distribution at the outlet by adding appropriately positioned and designed guide vanes or rotating cylinders adjacent the inflow end of the flow spreader. A flow spreader 49 embodying suction slots and guide vanes is illustrated in Figure 5. In this figure, an inflow conduit 51 of square or rectangular cross section connects with the rigid-walled, laterally-diverging flow spreader 49, which is similar to the flow spreader 33 shown in Figures 1 and 2, and the flow spreader 49 in turn connects with a straight-sided outflow conduit 53. As in the previously described embodiment, the diverging side walls of the flow spreader 49 are provided with a plurality of suction slots 55 for removal of the lower energy fluid from the boundary layer. If the pressure within the flow spreader is sufficiently high, the suction slots 55 may connect through conduits 57, 59, and 61 directly into a fluid supply system (not shown) instead of a fan pump as in Figure 1. Each of the conduits 57 is provided with a control valve 65 for regulating the amount of fluid drawn therethrough.

A plurality of longitudinally extending vane units 67 are positioned at the throat or the inflow end of the flow spreader unit in addition to the suction slots 55, and as shown in Figure 5, each of the vanes 67, except the central or base vane 67a, includes a curved or arcuate section 69 at the upstream end which is tangent to and merges with a flat section 71 at the downstream end. Each of the illustrated vanes 67 and 67a is fabricated from a rectangularly-shaped metal plate of uniform thickness. The curved sections 69 of the vanes 67 are sections of right cylinders of circular cross section, and the faces of the flat section 71 are coincident with vertical planes. The central vane or vanes 67a may be straight. As illustrated, the degree of curvature of the arcuate sections 69 of the vanes 67 near the outer edges of the flow spreader is less than the degree of curvature of the arcuate sections 69 of the inner vanes.

As will hereinafter appear in greater detail, the vanes constitute control elements which control and adjust the pressure and velocity relationship existing in the flowing stream passing through the flow spreader. Hence, the vanes should be of such shape or character that they react dynamically with the stream; i. e., a condition of dynamic lift is realized. Curved sections other than sections of circular, cross section right cylinders can be used in the curved sections of the guide vanes in accordance with the invention. For example, right sections of cylindrical surfaces generated along conic curves such as parabolas or hyperbolas can be used, as can spiral functions and other curves. In general, the shape of the curved section becomes increasingly critical as the flow velocity increases.

It is also possible, at least in certain cases, to obtain sufficient dynamic lift to control and adjust the pressure and velocity relationhips in the flowing stream with guide vanes (not shown) which have straight sections at their upstream ends as well as straight sections at their downstream ends, with the straight upstream section of each vane arranged at an angle with respect to its downstream section and connected thereto through a relatively short curved section.

In order to facilitate the accomplishing of the objects of the invention, each of the vanes 67 and 67a is supported on suitable pivots 73 so as to be rotatable to a limited extent about a vertical axis, which in the illustrated structure is coincident with the center line of the vane at the intersection of the curved and the flat sections of each of the vanes.

The upper end of each of the upper pivots 73 is threaded for engagement with a suitable clamp nut 75, in order that the vanes may be locked in position after adjustment. As illustrated, the radius of curvature of the arcuate sections of the vanes nearest the outer edges of the flow spreader is less than the radius of curvature of the arcuate sections of the inner vanes.

The vanes 67 are disposed with their axes of rotation in spaced, parallel relationship, and the dimensions of the vanes are such that the upper and lower edge surfaces thereof clear freely the upper and lower defining walls of the flow spreader 49. When used for the control of flowing streams of liquids containing fibrous suspensions or dispersions, such as the liquid stock normally used in papermaking, the clearance between the vane edges and the adjacent walls of the flow spreader may desirably be within the range of from about one-fourth to one inch. The vanes should, however, be of such width that at least eighty percent of the depth of the flowing stream is subjected to flow control by vane action. In air systems, less clearance can be used.

Figure 7:
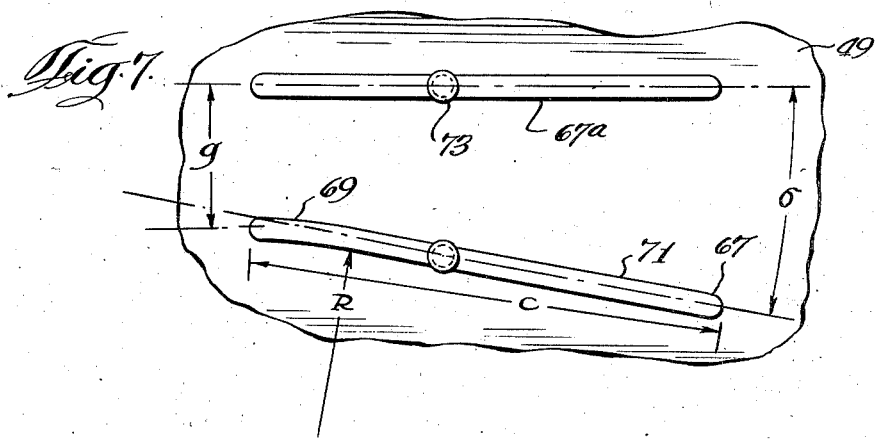
Figure 7 is an enlarged fragmentary plan view of two of the guide vanes provided in the structure of Figure 5.

The vanes 67 and 67a divide the throat or inflow end of the flow spreader 49 into a plurality of segmental sections as shown particularly in Figures 5 and 7. The vanes 67 are symmetrically arranged and divide the throat of the flow spreader 49 into substantially equal angular segments, each of which encompasses a divergence angle $\sigma$. When this vane arrangement is used, the divergence angle $\sigma$ included between each of the vane sections should not exceed 15°, and for best results, this angle should be within the range of from approximately 3 to 6°. The flat trailing section 71 of each vane 67 is normally disposed in a plane which intersects the axis of rotation of that vane and is coincident with the segmental division lines, as illustrated.

It follows that, in order to determine the number of vanes which will be required in a particular flow spreader of the general type shown in Figure 5, the total effective angle of divergence of the flow spreader expressed in degrees, when divided by fifteen, will give the minimum possible number of segmental divisions of the flowing stream. The total divergence angle of the flow spreader is the angle subtended by straight lines joining the extreme side edges of the inflow and outflow openings of the flow spreader, as illustrated at $\alpha$ in Figure 5. In this connection, it should be noted that the number of segmental areas is one greater than the number of vanes. Thus, the minimum number of vanes N is equal to $$\frac{\alpha \text{ (in degrees)}}{15} - 1$$

The total angle of divergence in a flow spreader unit employing suction slots and flow control vanes in accordance with the invention may reach a maximum of 180°.

The effectiveness of the vanes in accomplishing flow control is necessarily dependent upon the velocity of the flowing stream in the region in which the vanes are located. In general, the flow velocity must be sufficient to develop circulation or "lift" at the vane surfaces and for vanes of the type disclosed in the present application, this means that the vanes must be located in regions where the flow velocity is at least approximately one-half foot per second for liquid suspensions such as paper stock, and is at least approximately one-quarter foot per second for fibrous suspensions in air. The preferred operating range for both liquids and gases is from about five to ten feet per second in the vane region.

The lifting force on the guide vanes arises from the fact that the guide vanes are curved, thus producing an ever increasing angularity to the relative normal motion of the fluid. The magnitude of the force will depend upon the angle of inclination of the vane member to the normal direction of flow; which in turn is then given an angular component of momentum of the same order of magnitude as the angular relationship of vane to the normal stream flow. Unless lift is developed on the vane, there cannot be sufficient momentum imparted to the fluid to divert it from its normal path; and consequently, there can be no control of pressure and velocity across the flow spreader at its outlet. Furthermore, eddying and separation of flow may occur in the flow spreader proper under conditions of no lift on the guide vanes due to their inability to deflect the flow properly under conditions of no lift.

Since the maximum flow velocities are usually found at the inflow end or throat section of the flow spreader, it will usually be found advantageous to locate the vanes in this region, although the vanes can be placed downstream of the inflow end of the flow spreader, provided that the flow velocity in the selected region is adequate. Location of the flow control vanes in the throat section of the flow spreader has, however, certain other advantages. Particularly, the increased velocity existing in this region assures maximum scouring of the vanes during the operation of the flow spreader, this being of particular importance in systems containing fiber dispersions. Also, it is advantageous to effect the desired correction of the pressure and velocity conditions within the flowing stream as soon as possible along the flow spreader, flow control in this manner favoring the obtaining of steady-state flow within the flow spreader.

The dimensioning of the individual guide vanes located in the throat of the flow spreader is another feature of importance in assuring the development of adequate reaction force or "lift" at the vane surfaces. Generally, the vane dimensions should be such that the gap to chord ratio, i. e., the ratio of the segmental distance between the parallel leading edges of adjacent vanes (the dimension $g$ of Figure 7) and the chord to each vane (the dimension $c$ of Figure 7), should be within the range of from 1:2 to 1:4.

The use of suction slots and flow control vanes as outlined in the foregoing will effect quite remarkable improvement in the pressure and velocity relationships existing at the outflow end of the flow spreader, as compared with structures wherein vanes are not used.

The curve labeled III in Figure 4 shows the effect of suction slots and guide vanes in a flow spreader and it will be evident that a remarkable improvement in the flow characteristics at the outflow end of the spreader has been accomplished by the addition of the vanes.

In the exemplified embodiment of the invention described in the foregoing, the flow control vanes 67 and 67a have been arranged symmetrically with respect to the central axis of the flow spreader. This arrangement will usually be found to be quite satisfactory for accomplishing the objects of the invention, provided that the velocity distribution in the flowing stream is reasonably symmetrical in the two halves of the flow spreader, since by relatively minor adjustment of the vanes, it becomes possible to attain substantially equal volumetic discharge of fluid in each segmental section. In some flow conduit systems of web-forming equipment, however, the flowing stream which is delivered to the inflow end of the flow spreader may, for one reason or another, exhibit less uniform velocity distribution. For example, in paper-making machines where the fan pump is located in close proximity to the inflow end of the flow spreader, one-sided or asymmetric velocity and pressure relationships may be found in the flowing stream obtained in the stock conduit. When a stream of this character passes through a flow spreader which is provided with suction slots, the uneven pressure and velocity distribution at the inflow end will tend to carry through to the outflow end with uneven volumetric discharge from the segmental sections with the possibility that transient or sustained oscillatory conditions may be set up in the stream passing from the flow spreader. The velocity relationship in a stream of this character is illustrated in the graph, Figure 9, which is generally similar to Figure 4, and wherein the curve labeled I illustrates the velocity distribution across the outflow end of the flow spreader under the above described conditions and in the absence of suction slots or guide vanes.

Figure 8:
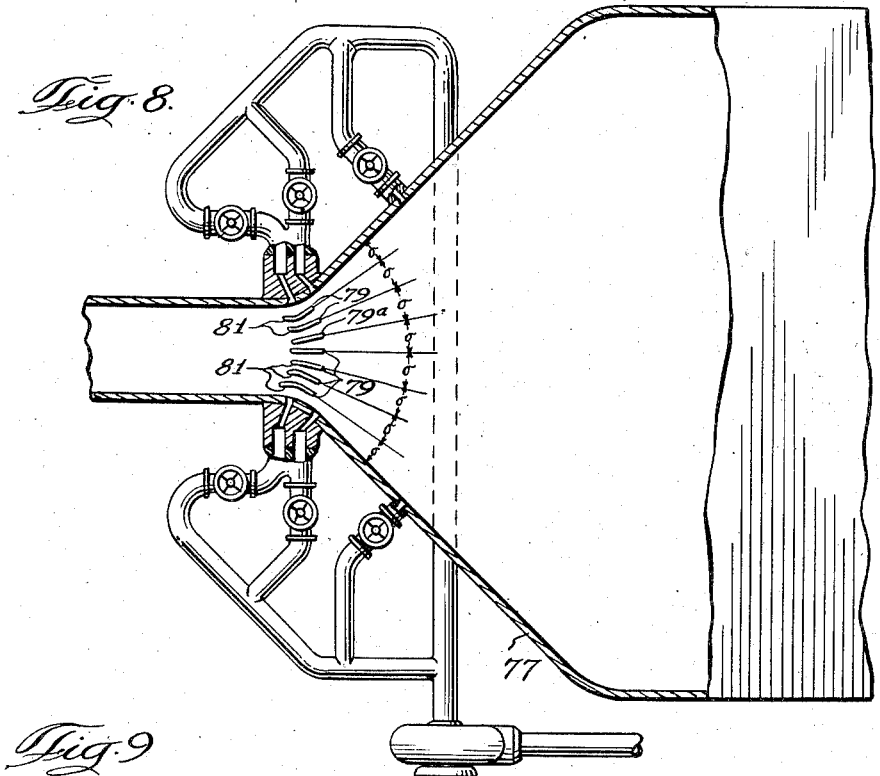
Figure 8 is a plan view, partially in section, of a portion of a flow conduit system similar to Figure 5, illustrating other features of the invention.

In instances of this type, it will be found desirable to use suction slots and control vane arrangements which are asymmetrically disposed with relation to the central axis of the flow spreader. Such an arrangement is illustrated in Figure 8. In this construction, the flowing stream passing through the flow spreader 77 is divided by a plurality of control vanes 79 and 79a (which may be similar to the vanes 67 and 67a of Figure 5) into segmental sections, each of which includes a divergence angle $\sigma$ of not more than 15° (and preferably within the range of 3 to 6°) as previously described. However, in this construction, the straight or bass control vane 79a is located as near as possible to the center of the maximum velocity region in the flowing stream admitted to the throat of the flow spreader, and the outer vanes 79 (which include curved upstream sections 81) are disposed at either side of the base vane 79a. As in the previously described embodiment, the curved sections 81 of the vanes constitute sections of right cylinders and the degree of curvature increases in the individual vanes 79 outwardly from the base vane 79a.

Figure 9:
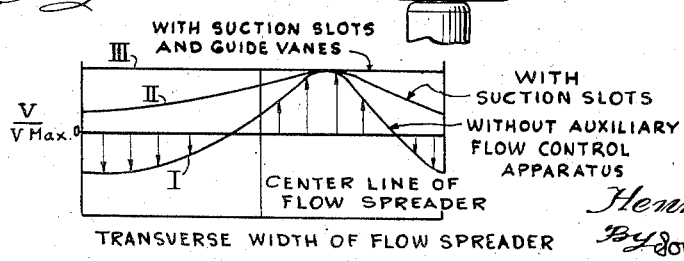
Figure 9 is a graph illustrating certain of the hydraulic characteristics of the flow conduit structure shown in Figure 8.

The curve labeled II in Figure 9 illustrates the uniforming of the velocity distribution across the outflow end of the flow spreader which is effected by the use of suction slots alone. It will be seen that the suction slots effect a considerable improvement in the velocity distribution, but do not eliminate the asymmetry of the velocity distribution across the outflow end of the flow spreader. The curve labeled III shows the effect of the combination of suction slots and asymmetrically-located control vanes as above described. This latter arrangement makes possible a very effective evening-out of the flow with the additional advantage of minimizing the possibility of pulsations or other undesirable transient conditions.

In the previously described structures, the vane arrangements are on a geometric basis, i. e., the flow path is divided into a plurality of flow segments having equal divergence angles. For best results, the volumetric discharge from the several segments produced by the control vanes should be substantially equal, and this condition is generally obtained by the described geometric spacing of the vanes, provided that the velocity pattern is not too irregular or too one-sided.

However, the vane arrangement may be based on an actual measured division of the flow path into segments of equal flow, and where particularly accurate control is desired, this division may be preferred. The determination of the boundaries of the equal flow segments can be conveniently made by a velocity transverse of the area of the flow path. The number of segments N remains the same regardless of whether equal angle or equal flow volume segments are used, i. e., the minimum number of segments N is equal to $$\frac{\alpha \text{ (in degrees)}}{A} - 1$$

where A is not more than 15, and is preferably within the range of 3 to 6.

The control vane arrangements used in the previously described embodiments of the invention are, except for the base vane which is preferably flat, curved in one direction only, i. e., all of the vanes have a curved leading section, the surfaces of which are tangent to and merge with the surfaces of the flat-surfaced trailing section. Also, the surfaces of the curved sections of the disclosed structures are coincident with the surfaces of vertically disposed, right cylinders of circular cross section. All of the disclosed vanes are essentially of uniform thickness except for the slight rounding of the leading edges. With vanes of this type, it is possible to achieve a very high degree of control of flowing streams of liquids and gases in web-forming equipment, which streams may contain fibrous suspensions or dispersions; as for example, the stream of stock passing through the flow spreader of a papermaking machine.

The principles of flow control herein discussed are, however, not limited to the use of vanes which are curved in only one direction, or to vanes which are of generally uniform thickness, and in instances where added refinement of control is desired, multiple curved vanes (not shown) and vanes of special cross-sectional outline (not shown) may be used. For example, the vanes may be similar to those shown in Figures 5 and 6 with the added provision that the generally flat-surfaced trailing sections of the vanes are twisted or skewed relative to the leading sections of the vanes. The resultant vanes will then have flow control surfaces in both the horizontal and the vertical plane; i. e., the vanes are curved in two directions. An example of a flow spreader employing vanes which are curved in two directions and which are of non-uniform thickness is illustrated and described in application Serial No. 119,140, now Patent No. 2,684,690, assigned to the same assignee as that of the present application.

The double curvature of the vanes makes possible a considerable refinement in the control accomplished by the vanes. Particularly, the double curved arrangement of the vane surfaces, by imparting a slight twisting action to the stream acted upon by each vane, effects substantial erasure of the wake which is produced downstream of that vane in a very short distance of flow. Important improvement in the stability and steadiness of flow thereby results.

A flow spreader embodying another flow control mechanism in accordance with the general principles of the present invention is illustrated in Figures 10 and 11. This structure includes an inflow conduit 85 of rectangular or square cross section, a flow-spreading section 87, and an outflow conduit 89, conveniently fabricated of plate sections, and it employs flow control means which consist of a plurality of suction slots 91 and a plurality of independently driven, generally symmetrically-arranged, rotatable rods or shaft-units 93 of circular cross section. These shaft-units, as illustrated in the drawings, are located so as to define segmental flow sections in the flow path through the flow spreader similar to the vane structure previously described, except that there is no control unit on the center line of the flow spreader. In this connection, it will be understood that the flat control vane can be omitted under very favorable flow conditions, and that, in general, the vanes and rotating shafts are comparable flow control mechanisms.

Each of the segmental sections into which the flow spreader is divided for the purpose of locating the flow control shaft-units 93 should include a divergence angle of not more than 15°, and preferably should include an angle within the range of from 3 to 6°. Such a division is illustrated in Figure 10 where the total divergence angle is indicated by the angle $\alpha$ and the segmental sections by the angles $\sigma$. The shaft-units 93 have polished surfaces and have diameters which are desirably within the range of from about one-tenth to one-fourth of the transverse width of the segmental sections at the region in which they are located. The shaft-units may be located centrally of segmental sections of equal flow per unit of time as in the previously described structure.

Each of the flow control shaft-units 93 is arranged to be independently driven at selected speed by means of independent, variable-speed motor drives 95. The shaft-units in the opposite halves of the flow spreader are driven in opposite directions as indicated by the arrows in Figure 10, unless the velocity and pressure relationships of the inflow stream are asymmetrical. In such instances, the rotation of the rods is arranged to reverse on either side of the center of the flow pattern. The shaft-units 93 should be driven at a relatively high speed in order to minimize the possibility of wake formation. Generally, the speed of rotation of the shaft-units should be sufficient to produce peripheral speeds at the surface of the units which are at least four times the flow velocity in the region of those units.

It should be understood that guide vanes or rotatable shaft-units may also be used to advantage in flow-spreading units wherein energy is added to portions of the slower moving fluid adjacent the side walls of the flow-spreading unit. Since the position, shape, and operation of the guide vanes or rotatable rods is similar regardless of whether lower energy fluid is removed from adjacent the side walls of the flow-spreading unit or energy is added to the slower moving fluid adjacent the side walls of the flow-spreading unit, it is believed unnecessary to discuss those embodiments wherein guide vanes or rotatable rods are utilized together with means for selectively adding energy to the slower moving fluid adjacent the side walls of the flow-spreading unit.

An example of a papermaking stock supply conduit system having embodied therein a flow-spreading section or unit in accordance with the present invention is illustrated somewhat diagrammatically in Figure 12. In this figure, the stock fan or pump by which the stock is delivered to the web-forming region of the machine is illustrated at 97. The pump 97 has a circular discharge outlet, and the system includes a transition section 99 which changes the shape of the flowing stream discharged by the pump from a circular outline to a square outline. The transition section 99 connects the outflow side of the pump 97 to the inflow end of a flow-spreading unit 101. The transition section 99 is suitably proportioned and dimensioned so that the flowing stream is in a steady-state flow condition when it reaches the entrance of the flow-spreading unit. The flow-spreading unit 101 embodies flow control means, including suction slots 103, and control vanes 105, similar to that illustrated in Figure 5.

More particularly, the flow-spreading unit 101 constitues, in effect, the initial portion of a much larger flow spreader 107 which includes an initial horizontal section 109, an elbow section 111, and a vertical section 113. The flow passageway 115 through the flow spreader 107 is rectangular in cross section, and it increases uniformly in width until it reaches the full width of the machine at the inflow side of the machine inlet 117. The cross-sectional area of the flow passageway 115 increases gradually in the direction of flow, the area of the outflow opening at the point where the passageway 115 connects with the passageway 119 in the inlet, being, in the illustrated structure, about 300 percent of the area of the inflow opening of the unit 107. The inlet flow passageway 119 is of generally uniform cross section and this passageway maintains a stream of stock in a substantially uniform and steady-state flow condition to the web-forming region of the machine, in which region the stock is discharged against and in part through the Fourdrinier wire illustrated at 121. The wire 121 is supported by the usual breast roll 123 so as to extend across the outlet end of the inlet, and the apparatus includes a slice 125 of known type for confining the flowing stream of liquid delivered by the inlet 117 to the web-forming region. The breast roll 123 may be of conventional structure or otherwise, and the usual suction boxes 127 or other means will be provided for aiding in effecting drainage of water through the wire 121 during the web-forming operation.

As previously indicated, the cross-sectional area of the stock conduit system embodying the flow-spreading and flow-controlling means of the present invention generally increases in a gradual fashion axially along the path of flow of the stock. It is possible, however, to operate a stock supply system such as that illustrated in Figure 12 with a flow conduit of substantially uniform cross-sectional area, or even gradually decreasing cross-sectional area along a portion of its length.

The provision of flow control means in accordance with the invention immediately following the fan pump as shown in Figure 12 has certain advantages in that the flowing stream is established in a substantially uniform, steady-state condition at the earliest possible point in the stock conduit. In this connection, it should be noted that while the stream entering the flow spreader should be in a steady-state condition, it may not have a uniform velocity distribution across the width of the flow spreader. The arrangement has the advantage that the control vanes are located at a considerable distance from the web-forming region, and to that extent, the control effected in the critical region is reduced. As an alternative arrangement, the control vanes may be located at some other point in the flow-spreading portion of the system closer to the web-forming region, and a set or plurality of sets of control vanes spaced along the stock conduit may be used. The arrangement of Figure 12 is, however, particularly adapted for incorporation into existing machine structures without material modification of the remaining portions of the stock conduit and flow-spreading system.

The flow spreader includes vertical suction slots 103 positioned along the sides of the flow-spreading unit 101 and horizontal section 109. The shape and location of the suction slots may be determined in the manner previously described in connection with the flow spreader 33 illustrated in Figure 1. The amount of liquid withdrawn through each of the suction slots 103 may be controlled by adjusting an associated control valve 129. If desired, the liquid withdrawn through the suction slots 103 may be mixed with additional pulp or stock and reused by the machine.

The flow-spreading and flow control unit 101 also includes flow control vanes 105 of the single curvature type as shown in Figure 13, and these vanes are arranged so as to divide the flow spreader into segmental sections encompassing divergence angles of approximately 3°. These vanes are made from suitable plate material, and each of the vanes outwardly of the flat-sided central or base vane 105a, includes a cylindrical, curved section 131 at the stock inflow side which merges with a flat section 133 at the outflow side.

The surfaces of the curved sections 131 are surfaces of right, vertical cylinders of circular cross section, and the curvature of these surfaces increases as the vanes progress outwardly from the base vane 105a. For example, in a unit having an inflow opening 135 (Figure 14) approximately 18 inches square, the curved section 131 of the outermost vane 105 constituted a section of the surface of a cylinder of 12 inches in diameter, and the curved section of the innermost vane 105 constituted a section of the surface of a cylinder 48 inches in diameter. The intermediate curved sections 131 constituted sections of the surfaces of cylinders having diameters intermediate these limits. The leading and trailing edges of the vanes are preferably rounded as in the previously described vane structures.

Each of the vanes 105 is supported for limited, rotative adjustment about a vertical axis coincident with the center line of the vane at the intersection of the curved and flat sections thereof by suitable pivots or spindles 137. The upper spindles 137 are each provided with a projecting portion which is engaged by suitable adjusting arms 139, and the outer ends of these arms are held by pairs of adjustable nuts 141 disposed on a transversely extending, threaded rod 143 as illustrated in Figure 15.

An example of air-forming equipment which utilizes flow control means in accordance with the present invention is illustrated somewhat diagrammatically in Figure 16. In this figure, fiber in the form of a very dense, self-sustaining bat 145 is fed into a picker roll or similar mechanism 147 by a feed roll 149. The picker roll 147 is located in the upper portion of a forming chamber 151. The picker roll 147 rotating against the end portion of the bat of fibers 145 produces a stream of separated fibers 153 which are directed toward a forming wire 155 which defines the lower end of the forming chamber 151. The forming wire 155 is in the form of an endless belt which is trained around and guided by suitable rolls 157.

Air is supplied to the forming chamber 151 through inlet openings 159 and 161 in the form of wide and relatively narrow flowing streams of rectangular cross section. The air streams within the forming chamber 151, which result from the delivery of air through the inlet openings 159 and 161, flow against and in the direction of the stream of fibers and have the effect of controlling the width and position of the fiber stream. Air is drawn through the forming wire 155 into a suction box 163 which is connected by a suitable conduit 165 to the intake of a suction fan (not shown). The fibers in the stream are deposited in the form of a loose web 167 on the forming wire 155. As the forming wire 155 emerges from the forming chamber 151, it passes between a pair of rubber-covered rolls 169 which are arranged to compress the web 167 formed on the wire 155 so as to cause a physical interattachment of the fibers to render the web 167 self-supporting.

The air which is directed into the forming chamber 151 through the inlet openings 159 and 161 is supplied by a suitable blower (not shown). The air from the blower is directed into a main supply conduit 171, and thence into generally circular branched conduits 173. The conduits 173 connect with transition sections 175 which change the shape of the flowing streams from a circular to a square outline. Each of the transition sections 175 connects with the inflow end of a flow spreader 177 embodying flow control means in accordance with the present invention. Each of the flow spreaders 177 is rectangular in cross section and increases uniformly in width until it reaches the width of the forming chamber 151. Flow control means embodied in each of the flow spreaders includes a plurality of transverse suction slots 179 on each side thereof which are shaped and located in the manner previously set forth. The suction slots 179 connect with the branched conduits 181 which connect with a common conduit 183, which in turn connects with a suction fan 185. The amount of air which is drawn through each of the suction slots 179 is controlled by means of a suitable control valve 187. Each of the flow spreaders 177 may in addition, if desired, contain guide vanes (not shown) in accordance with the principles of the present invention. The outflow ends of the flow spreaders 177 connect with conduits 189 which extend to and connect with the forming chamber 151.

Although one may provide a separate blower for supplying air to the conduit 171 and separate suction fans for removing air from the suction box 163 and the suction slots 179, for economic reasons and simplicity of construction, it is generally the practice to recirculate the air in the system through the aid of a common suction fan and blower and a closed conduit system. The recirculated air generally includes fine fibers which pass through the forming wire 155. If desired, one may mix various materials with the fibers by adding such materials to the air streams between the blower and the forming chamber 151, preferably within the conduit 173 which directs the air stream to the inlet opening 159 so that such materials are directed into the forming chamber 151 in the direction of movement of the fiber stream 153.

The conduits 173 and transition sections 175 are suitably proportioned so that the air streams reach the inlets to the flow spreaders 177 under substantially stable flow conditions; the flow spreaders 177 and flow control means widen the streams and at the same time suitably adjust the pressure and velocity conditions transversely of the streams to attain conditions of substantially steady-state flow with substantially uniform pressure and velocity across the width of the widened streams at the outflow ends of the flow spreaders 177; and the conduits 189 which connect the outflow ends of the flow spreaders 177 with the forming chamber 151 are suitably proportioned and dimensioned so that the air streams are maintained in substantially uniform and steady-state flow condition from the outlets of the flow spreaders 177 to the forming chamber 151.

In the above described Fourdrinier papermaking machine and air-forming equipment, one may selectively add energy to portions of the slower moving fluid adjacent the side walls of the flow-spreading units instead of removing portions of the fluid therefrom. As previously indicated, such energy could be added to the slower moving fluid by directing fluid jets into the flow spreaders in a direction generally parallel to the side walls thereof, by mechanical means such as moving the belts which parallel the walls of the flow spreaders, etc.

In the foregoing, various means for effecting the control of flowing streams of liquids and gases within web-forming equipment have been disclosed. The flow control means of the present invention accomplishes sufficiently effective control of flowing streams of liquids and gases within web-forming equipment to assure uniform as well as steady-state flow throughout such streams at the web-forming region of the equipment. Structurally, the invention is relatively simple and may be easily embodied into the usual web-forming equipment at relatively low cost.

Other important advantages of the invention result from the fact that the flow control means accomplishes the desired flow control without introducing any substantial pressure drop or head loss into the system; the flow control means of the invention thus operates at very high efficiencies. The capability of the flow control means of the invention to effectively control flowing streams at very wide divergence angles is likewise an important feature of the invention because of the resulting economic advantages and the reduction of the sizes of equipment, buildings, etc.

Various features of the invention which are believed to be new are set forth in the accompanying claims.

I claim:

1. In flow control apparatus of the class described, a laterally diverging conduit for containing a flowing stream of fluid, said laterally diverging conduit having a greater cross-sectional area at its outflow end than at its inflow end, and means for removing a portion of the lower energy fluid from adjacent at least one of the side walls of said diverging conduit for maintaining said fluid in a substantially steady-state flow condition within said diverging conduit and so as to provide said fluid with a more uniform velocity distribution across the width of the widened stream at the outflow end of said diverging conduit than would otherwise exist.

2. In flow control apparatus of the class described, a laterally diverging conduit of generally expanding cross-sectional area for containing a flowing stream of fluid, at least one outlet opening in the side walls of said diverging conduit through which a portion of the fluid may be withdrawn from said laterally diverging conduit, suction means for drawing fluid from said laterally diverging conduit through each of said openings and conduits connecting said suction means with each of said openings for containing the fluid withdrawn from said diverging conduit through each of said outlet openings.

3. In flow control apparatus of the class described, a laterally diverging conduit for containing a flowing stream of fluid, a plurality of outlet openings in the side walls of said diverging conduit through which a portion of the fluid may be withdrawn from said diverging conduit, suction means for drawing fluid from said diverging conduit through said outlet openings in said side walls, and conduits connecting said suction means with each of said outlet openings for containing the fluid withdrawn from said diverging conduit through said outlet openings.

4. In flow control apparatus of the class described, a laterally diverging conduit for containing a flowing stream of fluid, a plurality of outlet openings in the side walls of said diverging conduit through which a portion of the fluid may be withdrawn from said diverging conduit, suction means for drawing fluid from said diverging conduit through said outlet openings, conduits connecting said suction means with each of said outlet openings for containing the fluid withdrawn from said diverging conduit through said outlet openings, and control means within each of said connecting conduits for regulating the amount of fluid withdrawn from said diverging conduit through each of said outlet openings.

5. In flow control apparatus of the class described, a laterally diverging conduit for containing a flowing stream of fluid, the side walls of said diverging conduit being provided with at least one transversely extending suction slot through which a portion of the fluid may be withdrawn from said diverging conduit, suction means for drawing fluid from said diverging conduit through each suction slot, conduits connecting said suction means with each suction slot, control means within said conduits for individually regulating the amount of fluid withdrawn from said diverging conduit through each suction slot, the upstream edge of each suction slot being rounded so as to permit the fluid immediately upstream of said suction slot to pass into said suction slot under stable flow conditions and the downstream edge of each suction slot being just broken so as to create a line of stagnation points within the stream extending along the downstream edge of said suction slot.

6. In flow control apparatus of the class described, a laterally diverging conduit for containing a flowing stream of fluid, the side walls of said diverging conduit being provided with at least one transversely extending suction slot through which a portion of the fluid may be withdrawn from said diverging conduit, suction means for drawing fluid from said laterally diverging conduit through each suction slot, conduits connecting said suction means with each suction slot, each suction slot having a width ¼ to 4 times the width of the boundary layer of said fluid stream and extending at least 75 percent of the height of the side wall within which it is located, and each suction slot extending outwardly from the inner face of the side wall within which it is located at an angle between 50° and 130° for a distance at least twice the width of the suction slot.

7. The flow control apparatus of the class described, a laterally diverging conduit of generally rectangular cross-section for containing a flowing stream of fluid, the side walls of said diverging conduit being provided with at least one opening, means for passing a controlled amount of fluid through each opening so as to increase the average kinetic energy of portions of the fluid flowing within and adjacent the side walls of said diverging conduit, and a plurality of spaced apart, flow control members disposed within said diverging conduit in position to act upon segmental sections of said flowing stream which include a divergence angle within the range of from 3° to 15° for obtaining a uniform velocity distribution across the width of the widened stream at the outflow end of said diverging conduit.

8. In flow control apparatus of the class described, a laterally diverging conduit of generally rectangular cross-section for containing a flowing stream of fluid, the side walls of said diverging conduit being provided with a plurality of openings, means for passing a controlled amount of fluid through each of said openings so as to increase the average kinetic energy of portions of the fluid flowing within and adjacent the side walls of said diverging conduit, and a plurality of spaced apart flow control vanes disposed within said diverging conduit in position to act upon said flowing stream so as to obtain a substantially uniform velocity distribution across the width of the widened stream at the outflow end of said diverging conduit, each of a plurality of said flow control vanes having a section of predetermined curvature at the upstream end thereof and a section of less curvature at the downstream end thereof, and the gap to chord ratio of said vanes being within the range of from 1:2 to 1:4.

9. In flow control apparatus of the class described, a laterally diverging conduit of generally rectangular cross-section for containing a flowing stream of fluid, the side walls of said diverging conduit being provided with at least one opening, means for delivering a controlled amount of fluid to said diverging conduit through each opening so as to selectively add energy to portions of said flowing stream of fluid adjacent at least one of the side walls of said diverging conduit for maintaining said fluid in a substantially steady-state flow condition within said diverging conduit, and a plurality of spaced apart flow control vanes disposed between the diverging walls of said conduit, each of a plurality of said flow control vanes having a section of predetermined curvature at the upstream end thereof and a section of less curvature at the downstream end thereof, said flow control vanes controlling the stream of stock passing through said diverging conduit so as to obtain a substantially uniform velocity distribution across the width of the widened stream at the outflow end of said diverging conduit.

10. In flow control apparatus of the class described, a laterally diverging conduit of generally rectangular cross-section for containing a flowing stream of fluid, the side walls of said diverging conduit being provided with a plurality of openings, means for delivering a controlled amount of fluid to said diverging conduit through each of said openings so as to selectively add energy to portions of said flowing stream of fluid adjacent the side walls of said diverging conduit for maintaining said fluid in a substantially steady-state flow condition within said diverging conduit, and a plurality of spaced apart flow control vanes disposed between the diverging walls of said conduit and which divide said conduit into a plurality of segments, each of which encompasses a divergence angle of not more than 15°, each of a plurality of said flow control vanes having a section of predetermined curvature at the upstream end thereof and a section of less curvature at the downstream end thereof, said flow control vanes controlling the stream of stock passing through said laterally diverging conduit so as to obtain a substantially uniform velocity distribution across the width of the widened stream at the outflow end of said diverging conduit.

11. In flow control apparatus of the class described, a laterally diverging conduit of generally rectangular cross-section for containing a flowing stream of fluid, the side walls of said diverging conduit being provided with a plurality of openings, means for passing a controlled amount of fluid through each of said openings so as to increase the average kinetic energy of portions of the fluid flowing within and adjacent the side walls of said diverging conduit, and a plurality of spaced apart, rotatable shafts disposed between the laterally diverging walls of said conduit and which divide said diverging conduit into a plurality of segments, each of which encompasses a divergence angle within the range of from 3° to 15°, and means for rotating each of said shafts at individually controllable speeds, said rotatable shafts controlling the stream of stock passing through said diverging conduit so as to obtain a substantially uniform velocity distribution across the width of the widened stream at the outflow end of said diverging conduit.

12. In flow control apparatus of the class described, a laterally diverging conduit for containing a flowing stream of fluid, a plurality of outlet openings in the side walls of said diverging conduit through which a portion of the fluid may be withdrawn from said diverging conduit, suction means for drawing fluid from said diverging conduit through said outlet openings, and conduits connecting said suction means with said outlet openings for containing the fluid withdrawn from said diverging conduit through said outlet openings, the withdrawal of fluid through said outlet openings being such as to maintain said flowing stream of fluid in a substantially steady-state flow condition throughout said diverging conduit, and a plurality of spaced apart flow control vanes disposed between the diverging walls of said conduit, each of a plurality of said flow control vanes having a section of predetermined curvature at the upstream end thereof and a section of less curvature at the downstream end thereof, said flow control vanes controlling the stream of stock passing through said diverging conduit so as to obtain a substantially uniform velocity distribution across the width of the widened stream at the outflow end of said diverging conduit.

13. In flow control apparatus of the class described, a laterally diverging conduit for containing a flowing stream of fluid, a plurality of outlet openings in the side walls of said diverging conduit through which a portion of the fluid may be withdrawn from said diverging conduit, suction means for drawing fluid from said diverging conduit through said outlet openings, and conduits connecting said suction means with said outlet openings for containing the fluid withdrawn from said diverging conduit through said outlet openings, the withdrawal of fluid through said outlet openings being such as to maintain said flowing stream of fluid in a substantially steady-state flow condition throughout said diverging conduit, and a plurality of spaced apart flow control vanes disposed between the laterally diverging walls of said conduit and which divide said conduit into a plurality of segments, each of which encompasses a divergence angle of not more than 15°, each of a plurality of said flow control vanes having a section of predetermined curvature at the upstream end thereof and a section of less curvature at the downstream end thereof, said flow control vanes controlling the stream of stock passing through said laterally diverging conduit so as to obtain a substantially uniform velocity distribution across the width of the widened stream at the outflow end of said diverging conduit.

14. In flow control apparatus of the class described, a laterally diverging conduit for containing the flowing stream of fluid, said diverging conduit having a greater cross-sectional area at its outflow end than at its inflow end, a plurality of outlet openings in the side walls of said diverging conduit through which a portion of the fluid may be withdrawn from said diverging conduit, suction means for drawing fluid from said diverging conduit through said outlet openings, conduits connecting said suction means with each of said outlet openings for containing the fluid withdrawn from said diverging conduit through said outlet openings, control means within each of said connecting conduits for regulating the amount of fluid withdrawn through each of said outlet openings, and a plurality of spaced apart flow control vanes disposed between said laterally diverging walls of said conduit, said vanes dividing said conduit into a plurality of segments, each of which encompasses a divergence angle within the range of from 3° to 15°, the flow control vane located nearest the central axis of said flowing stream being flat and the other flow control vanes each having a curved section at the upstream end thereof and a flat section at the downstream end thereof which merges smoothly into said curved section, the curved sections at opposite sides of said flat vane being curved in opposite directions and the degree of curvature in said vanes increasing outwardly from said flat vane.

15. In flow control apparatus of the class described, a laterally diverging conduit of generally rectangular cross-section for containing a flowing stream of fluid, said diverging conduit having a greater cross-sectional area at its outflow end than at its inflow end, the side walls of said diverging conduit being provided with a plurality of transversely extending suction slots through which a portion of the fluid may be withdrawn from said diverging conduit, suction means for drawing fluid from said laterally diverging conduit through each of said suction slots, conduits connecting said suction means with each of said suction slots for containing said fluid withdrawn from said diverging conduit through said suction slots, control means within said connecting conduits for individually regulating the amount of fluid withdrawn from said diverging conduit through each of said suction slots, the upstream edge of each of said suction slots being rounded so as to permit the fluid immediately downstream of said suction slots to pass into said suction slots under stable flow conditions and the downstream edge of each suction slot being just broken so as to create lines of stagnation points within the stream extending along the downstream edges of said suction slots, each of said suction slots having a width ¼ to 4 times the width of the boundary layer of said fluid stream and extending at least 75 percent of the height of the side wall within which it is located, each of said suction slots extending outwardly from the inner face of the side wall within which it is located at an angle between 50 and 130° for a distance at least twice the width of the suction slots, and a plurality of spaced apart flow control vanes which are disposed between the laterally diverging walls of said conduit, said vanes dividing said conduit into a plurality of segments, each of which encompasses a divergence angle within the range of from 3° to 15°, the flow control vane located nearest the central axis of said flowing stream being flat and the other flow control vanes each having a curved section at the upstream end thereof and a flat section at the downstream end thereof which merges smoothly into said curved section, the curved sections at opposite sides of said flat vane being curved in opposite directions and the degree of curvature in said vanes increasing outwardly of said flat vane.

16. Flow control apparatus for web-forming equipment comprising an inflow conduit for containing a flowing stream of fluid, said inflow conduit having dimensions and proportions relative to the other elements of said web-forming equipment which are sufficient to establish said stream of fluid in a substantially steady-state flow condition at the outflow end of said inflow conduit, a laterally diverging conduit connected to said inflow conduit at the outflow end thereof for receiving the flowing stream of fluid from said inflow conduit, the side walls of said diverging conduit being provided with a plurality of openings, means for passing a controlled amount of fluid through each of said openings so as to increase the average kinetic energy of portions of the fluid flowing within and adjacent the side walls of said diverging conduit, and an outflow conduit connected to the outflow end of said laterally diverging conduit for carrying said widened flowing stream to the web-forming region of said web-forming equipment, said outflow conduit having dimensions and proportions relative to the other elements of said web-forming equipment which are sufficient to maintain said widened flowing stream of fluid in a substantially uniform and steady-state flow condition from the outflow end of said laterally diverging conduit to said web-forming region.

17. Flow control apparatus for web-forming equipment comprising an inflow conduit for containing a flowing stream of fluid, said inflow conduit having dimensions and proportions relative to the other elements of said web-forming equipment which are sufficient to establish said stream of fluid in a substantially steady-state flow condition at the outflow end of said inflow conduit, a laterally diverging conduit connected to said inflow conduit at the outflow end thereof for receiving the flowing stream of fluid from said inflow conduit, the side walls of said diverging conduit being provided with at least one opening, means for delivering a controlled amount of fluid through each of said openings so as to selectively add energy to portions of said flowing stream of fluid adjacent the side walls of said diverging conduit for maintaining said fluid in a substantially steady-state flow condition within said diverging conduit and so as to provide said fluid with a more uniform velocity distribution across the width of the widened stream at the outflow end of said diverging conduit than would otherwise exist, and an outflow conduit connected to the outflow end of said laterally diverging conduit for carrying said widened flowing stream to the web-forming region of said web-forming equipment, said outflow conduit having dimensions and proportions relative to the other elements of said web-forming equipment which are sufficient to maintain said widened flowing stream of fluid in a substantially uniform and steady-state flow condition from the outflow end of said laterally diverging conduit to said web-forming region.

18. Flow control apparatus for web-forming equipment comprising an inflow conduit for containing a flowing stream of fluid, said inflow conduit having dimensions and proportions relative to the other elements of said web-forming equipment which are sufficient to establish said stream of fluid in a substantially steady-state flow condition at the outflow end of said inflow conduit, a laterally diverging conduit connected to said inflow conduit at the outflow end thereof for receiving the flowing stream of fluid from said inflow conduit, means for removing a portion of the lower energy fluid from adjacent the side walls of said diverging conduit for maintaining said fluid in a substantially steady-state flow condition within said diverging conduit and so as to provide said fluid with a more uniform velocity distribution across the width of the widened stream at the outflow end of said diverging conduit that would otherwise exist, and an outflow conduit connected to the outflow end of said laterally diverging conduit for carrying said widened flowing stream to the web-forming region of said web-forming equipment, said outflow conduit having dimensions and proportions relative to the other elements of said web-forming equipment which are sufficient to maintain said widening flowing stream of fluid in a substantially uniform and steady-state flow condition from the outflow end of said laterally diverging conduit to said web-forming region.

19. Flow control apparatus for web-forming equipment comprising an inflow conduit for containing a flowing stream of fluid, said inflow conduit having dimensions and proportions relative to the other elements of said web-forming equipment which are sufficient to establish said stream of fluid in a substantially steady-state flow condition at the outflow end of said inflow conduit, a laterally diverging conduit connected to said inflow conduit at the outflow end thereof for receiving the flowing stream of fluid from said inflow conduit, the side walls of said diverging conduit being provided with a plurality of outlet openings through which a portion of the fluid may be withdrawn from said diverging conduit, suction means for drawing fluid from said diverging conduit through said outlet openings, and conduits connecting said suction means with each of said outlet openings for containing the fluid withdrawn from said diverging conduit through said outlet openings, the withdrawal of fluid through said outlet openings being such as to maintain said flowing stream of fluid in substantially uniform and steady-state flow condition throughout said diverging conduit, and an outflow conduit connected to the outflow end of said laterally diverging conduit for carrying said widened flowing stream to the web-forming region of said web-forming equipment, said outflow conduit having dimensions and proportions relative to the other elements of said web-forming equipment which are sufficient to maintain said widened flowing stream of fluid in a substantially uniform and steady-state flow condition from the outflow end of said diverging conduit to said web-forming region.

20. Flow control apparatus for web-forming equipment comprising an inflow conduit for containing a flowing stream of fluid, said inflow conduit having dimensions and proportions relative to the other elements of said web-forming equipment which are sufficient to establish said stream of fluid in a substantially steady-state flow condition at the outflow end of said inflow conduit, a laterally diverging conduit connected to said inflow conduit at the outflow end thereof for receiving the flowing stream of fluid from said inflow conduit, the side walls of said diverging conduit being provided with at least one transversely extending suction slot through which a portion of the fluid may be withdrawn from said diverging conduit, suction means for drawing fluid from said diverging conduit through each of said suction slots, conduits connecting said suction means with each of said suction slots for containing said fluid withdrawn from said diverging conduit through said suction slots, control means within said connecting conduits for individually regulating the amount of fluid withdrawn from said diverging conduit through each of said suction slots, said suction slots being suitably positioned, dimensioned, and shaped relative to the dimensions of said diverging conduit and the amount of fluid withdrawn so regulated as to maintain the fluid stream passing through said diverging conduit in a substantially uniform and steady-state flow condition, and an outflow conduit connected to the outflow end of said laterally diverging conduit for carrying said widened flowing stream to the web-forming region of said web-forming equipment, said outflow conduit having dimensions and proportions relative to the other elements of said web-forming equipment which are sufficient to maintain said widened flowing stream of fluid in a substantially uniform and steady-state flow condition from the outflow end of said laterally diverging conduit to said web-forming region.

21. Flow control apparatus for web-forming equipment comprising an inflow conduit for containing a flowing stream of fluid, said inflow conduit having dimensions and proportions relative to the other elements of said web-forming equipment which are sufficient to establish said stream of fluid in a substantially steady-state flow condition at the outflow end of said inflow conduit, a laterally diverging conduit connected to said inflow conduit at the outflow end thereof for receiving the flowing stream of fluid from said inflow conduit, the side walls of said diverging conduit being provided with a plurality of transversely extending suction slots through which a portion of the fluid may be withdrawn from said diverging conduit, suction means for drawing fluid from said diverging conduit through each of said suction slots, conduits connecting said suction means with each of said suction slots for containing said fluid withdrawn from said diverging conduit through said suction slots, control means within said connecting conduits for individually regulating the amount of fluid withdrawn from said diverging conduit through each of said suction slots, the upstream edge of each of said suction slots being rounded so as to permit the fluid in said diverging conduit immediately upstream of said suction slots to pass into said suction slots under stable flow conditions and the downstream edge of each of said suction slots being just broken so as to create a line of stagnation points within the stream extending along the downstream edge of each of said suction slots, each of said suction slots having a width 1/4 to 4 times the width of the boundary layer of said fluid stream passing through said diverging conduit and extending at least 75 percent of the height of the side wall within which it is located, each of said suction slots extending outwardly from the inner face of the side wall within which it is located at an angle between 50 and 130° for a distance at least twice the width of the suction slot, the withdrawal of fluid through said suction slots being such as to maintain said flowing stream passing through said diverging conduit in substantially uniform and steady-state flow condition, and an outflow conduit connected to the outflow end of said diverging conduit for carrying said widened flowing stream to the web-forming region of said web-forming equipment, said outflow conduit having dimensions and proportions relative to the other elements of said web-forming equipment which are sufficient to maintain said widened flowing stream of fluid in substantially uniform and steady-state flow condition from the outflow end of said diverging conduit to said web-forming region.

22. Flow control apparatus for web-forming equipment comprising an inflow conduit for containing a flowing stream of fluid, said inflow conduit having dimensions and proportions relative to the other elements of said web-forming equipment which are sufficient to establish said stream of fluid in a substantially steady-state flow condition at the outflow end of said inflow conduit, a laterally diverging conduit connected to said inflow conduit at the outflow end thereof for receiving the flowing stream of fluid from said inflow conduit, the side walls of said diverging conduit being provided with a plurality of openings, means for passing a controlled amount of fluid through each of said openings so as to increase the average kinetic energy of portions of the fluid flowing within and adjacent the side walls of said diverging conduit, and a plurality of spaced apart flow control members disposed within said diverging conduit in position to act upon segmental sections of said flowing stream which include a divergence angle within the range of from 3° to 15° for obtaining a uniform velocity distribution across the width of the widened stream at the outflow end of said diverging conduit, and an outflow conduit connected to the outflow end of said diverging conduit for carrying said widened flowing stream to the web-forming region of said web-forming equipment, said outflow conduit having dimensions and proportions relative to the other elements of said web-forming equipment which are sufficient to maintain said widened flowing stream of fluid in a substantially uniform and steady-state flow condition from the outflow end of said diverging conduit to said web-forming region.

23. Apparatus as defined in claim 22 wherein the flow control members constitute rotatable shafts and wherein said apparatus includes means for rotating each of said shafts at individually controllable speeds.

24. Apparatus as defined in claim 22 wherein the flow control members constitute flow control vanes, and each of a plurality of said flow control vanes having a suitable shape and dimensions so as to impart momentum to the portions of said stream flowing adjacent said flow control vane.

25. Flow control apparatus for web-forming equipment comprising an inflow conduit for containing a flowing stream of fluid, said inflow conduit having dimensions and proportions relative to the other elements of said web-forming equipment which are sufficient to establish said stream of fluid in a substantially steady-state flow condition at the outflow end of said inflow conduit, a laterally diverging conduit connected to said inflow conduit at the outflow end thereof for receiving the flowing stream of fluid from said inflow conduit, the side walls of said diverging conduit being provided with a plurality of outlet openings through which a portion of the fluid may be withdrawn from said laterally diverging conduit, suction means for drawing fluid from said diverging conduit through said outlet openings, and conduits connecting said suction means with each of said outlet openings for containing the fluid withdrawn from said diverging conduit through said outlet openings, the withdrawal of fluid through said outlet openings being such as to maintain said flowing stream of fluid in a substantially uniform and steady-state flow condition throughout said diverging conduit, a plurality of spaced apart flow control members disposed within said diverging conduit in position to act upon segmental sections of said flowing stream which include a divergence angle within the range of from 3° to 15° for obtaining a uniform velocity distribution across the width of the widened stream at the outflow end of said diverging conduit, and an outflow conduit connected to the outflow end of said laterally diverging conduit for carrying said widened flowing stream to the web-forming region of said web-forming equipment, said outflow conduit having dimensions and proportions relative to the other elements of said web-forming equipment which are sufficient to maintain said widened flowing stream of fluid in substantially uniform and steady-state flow condition from the outflow end of said laterally diverging conduit to said web-forming region.

26. Apparatus as defined in claim 25 wherein the flow control members constitute rotatable shafts and wherein said apparatus includes means for rotating each of said shafts at individually controllable speeds.

27. Apparatus as defined in claim 25 wherein the flow control members constitute flow control vanes and each of a plurality of said flow control vanes having a suitable shape and dimensions so as to impart momentum to the portions of said stream flowing adjacent said control vane.

28. Flow control apparatus for web-forming equipment comprising an inflow conduit for containing a flowing stream of fluid, said inflow conduit having dimensions and proportions relative to the other elements of said web-forming equipment which are sufficient to establish said stream of fluid in a substantially steady-state flow condition at the outflow end of said inflow conduit, a laterally diverging conduit connected to said inflow conduit at the outflow end thereof for receiving the flowing stream of fluid from said inflow conduit, the side walls of said diverging conduit being provided with a plurality of transversely extending suction slots through which a portion of the fluid may be withdrawn from said diverging conduit, suction means for drawing fluid from said diverging conduit through each of said suction slots, conduits connecting said suction means with each of said suction slots for containing said fluid withdrawn from said diverging conduit through said suction slots, control means within said connecting conduits for individually regulating the amount of fluid withdrawn from said diverging conduit through each of said suction slots, the withdrawal of fluid through said suction slots being such as to maintain said flowing stream of fluid in a substantially steady-state flow condition throughout said diverging conduit, a plurality of spaced apart flow control members disposed within said diverging conduit in position to act upon segmental sections of said flowing stream which include a divergence angle within the range of from 3° to 15° for obtaining a uniform velocity distribution across the width of the widened stream at the outflow end of said diverging conduit, and an outflow conduit connected to the outflow end of said diverging conduit for carrying said widened flowing stream to the web-forming region of said web-forming equipment, said outflow conduit having dimensions and proportions relative to the other elements of said web-forming equipment which are sufficient to maintain said widened flowing stream of fluid in substantially uniform and steady-state flow condition from the outflow end of said diverging conduit to said web-forming region.

29. Apparatus as defined in claim 28 wherein the flow control members constitute control vanes, and each of a plurality of said flow control vanes having a suitable shape and dimensions so as to impart momentum to the portions of the stream flowing adjacent said flow control vane.

30. A stock supply system for a papermaking machine comprising a stock supply conduit, means for establishing a flowing stream of stock in a substantially steady-state condition of flow within said stock supply conduit, a laterally diverging flow spreading conduit which connects with the outflow end of said stock supply conduit and which is operable to widen the flowing stream of stock delivered by said stock supply conduit, the side walls of said flow spreading conduit being provided with a plurality of outlet openings through which a portion of the fluid may be withdrawn from said flow spreading conduit, suction means for drawing fluid from said flow spreading conduit through said outlet openings, conduits connecting said suction means with each of said outlet openings for containing the fluid withdrawn from said flow spreading conduit through said outlet openings, the withdrawal of fluid through said outlet openings being such as to maintain the flowing stream of fluid in a substantially uniform and steady-state condition through said flow conduit and an inlet conduit connected to the outflow end of said flow spreading conduit and having an outflow opening adjacent the forming wire of said papermaking machine, said inlet conduit heaving dimensions and proportions relative to the other elements of said papermaking machine which are sufficient to maintain the widened flowing stream of fluid in said substantially uniform and steady-state flow condition from the outflow end of said flow spreading conduit to said forming wire.

31. A stock supply system for a papermaking machine comprising a stock supply conduit, means for establishing a flowing stream of stock in a substantially steady-state condition of flow within said stock supply conduit, a laterally diverging flow spreading conduit which connects with the outflow end of said stock supply conduit and which is operable to widen the flowing stream of stock delivered by said stock supply conduit, the side walls of said diverging conduit being provided with a plurality of openings, means for passing a controlled amount of fluid through each of said openings so as to crease the average kinetic energy of portions of the fluid flowing within and adjacent the side walls of said diverging conduit, and a plurality of spaced apart flow control members disposed within said flow spreading conduit in position to act upon segmental sections of said flowing stream which include a divergence angle within the range of from 3° to 15° for obtaining a uniform velocity distribution across the width of the widened stream at the outflow end of said flow spreading conduit, and an inlet conduit connected to the outflow end of said flow spreading conduit and having an outflow opening adjacent the forming wire of said papermaking machine, said inlet conduit having dimensions and proportions relative to the other elements of said papermaking machine which are sufficient to maintain the widened flowing stream of fluid in said substantially uniform and steady-state flow condition from the outflow end of said flow spreading conduit to said forming wire.

32. A stock supply system as defined in claim 31 wherein the flow control members include a plurality of flow control vanes, each of which has a section of predetermined surface curvature at the upstream end thereof and a section of less curvature at the downstream end thereof.

33. A stock supply system for a papermaking machine comprising a stock supply conduit, means for establishing a flowing stream of stock in a substantially steady-state condition of flow within said stock supply conduit, a laterally diverging flow spreading conduit which connects with the outflow end of said stock supply conduit and which is operable to widen the flowing stream of stock delivered by said stock supply conduit, the side walls of said flow spreading conduit being provided with a plurality of transversely extending suction slots through which a portion of the fluid may be withdrawn from said flow spreading conduit, suction means for drawing said fluid from said flow spreading conduit through each of said suction slots, conduits connecting said suction means with each of said suction slots for containing said stream of stock withdrawn from said flow spreading conduit through said suction slots, control means within said connecting conduits for individually regulating the amount of stock withdrawn from said flow spreading conduit through each of said suction slots, the withdrawal of stock through said suction slots being such as to maintain the flowing stream of stock in a substantially uniform and steady-state flow condition throughout said flow spreading conduit, a plurality of spaced apart flow control members disposed within said diverging conduit in position to act upon segmental sections of said flowing stream of stock which include a divergence angle within the range of from 3° to 15° for obtaining a uniform velocity distribution across the width of the widened stream at the outflow end of said flow spreading conduit, and an inlet conduit connected to the outflow end of said flow spreading conduit and having an outflow opening adjacent the forming wire of said papermaking machine, said inlet conduit having dimensions and proportions relative to the other elements of said papermaking machine which are sufficient to maintain the widened flowing stream of fluid in a substantially uniform and steady-state flow condition from the outflow end of said flow spreading conduit to said forming wire.

34. A stock supply system as defined in claim 33 wherein the flow control members include a plurality of flow control vanes, and each of a plurality of said flow control vanes having a suitable shape and dimensions so as to impart momentum to the portions of the stream flowing adjacent said flow control vane.

References Cited in the file of this patent

UNITED STATES PATENTS

| | | |
|---|---|---|
| 1,909,150 | Bell-Irving et al. | May 16, 1933 |
| 2,037,940 | Stalker | Apr. 21, 1936 |
| 2,329,799 | Thorsen | Sept. 21, 1943 |
| 2,402,063 | Malkin | June 11, 1946 |
| 2,684,690 | Lee | July 27, 1954 |

FOREIGN PATENTS

| | | |
|---|---|---|
| 535,589 | Germany | Oct. 14, 1931 |
| 478,859 | Canada | Nov. 27, 1951 |

OTHER REFERENCES

Gough: Pulp and Paper Magazine of Canada, April 1936, pages 259–262, copy in S. L.